April 22, 1924.
M. S. KINNEY
RIM
Filed Jan. 15, 1923
1,491,705
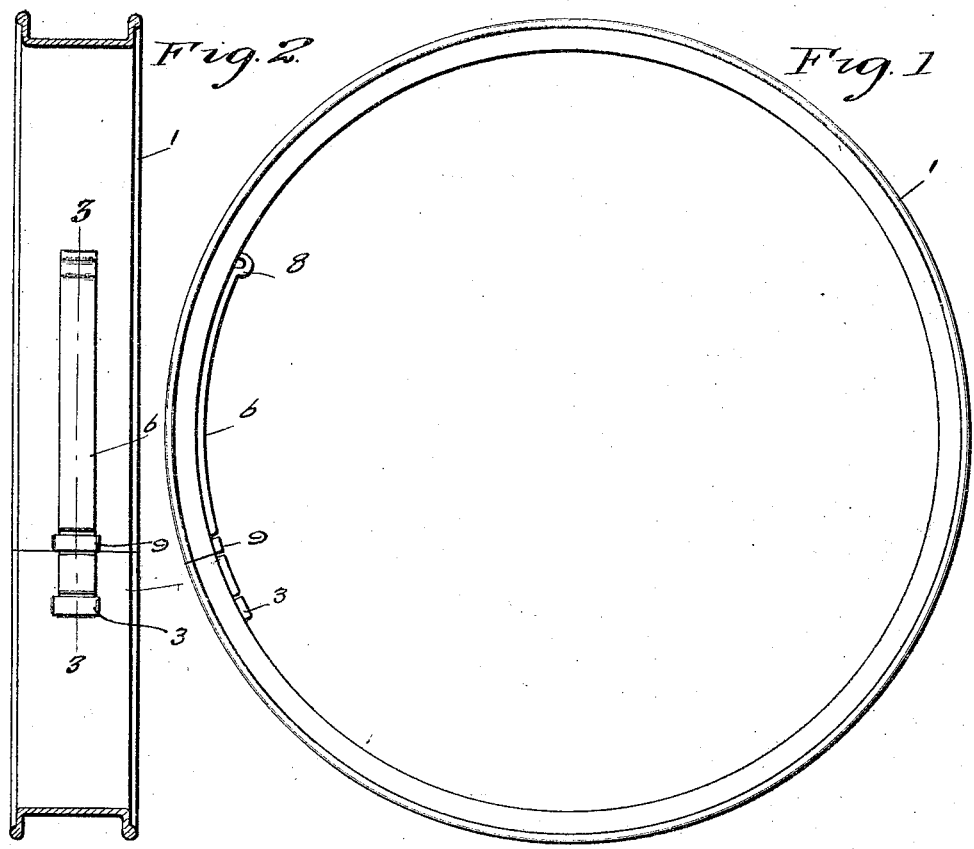
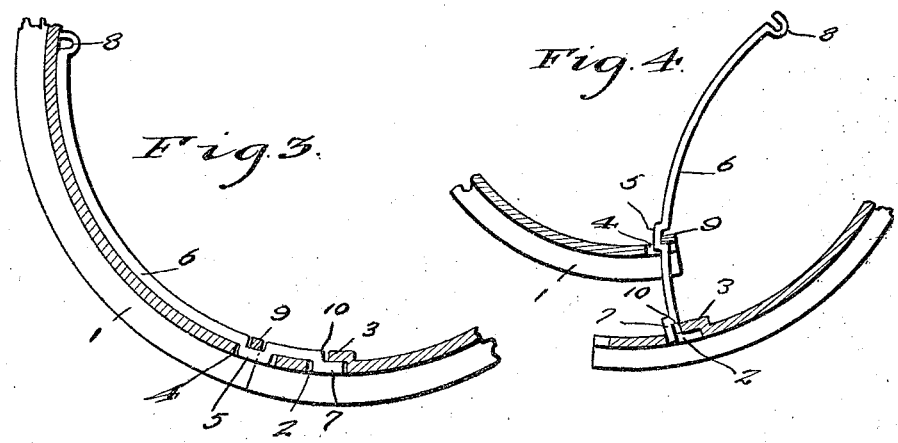
Mark S. Kinney INVENTOR
BY Victor J. Evans ATTORNEY
R. O. Thomas
WITNESSES Patented Apr. 22, 1924.

1,491,705

UNITED STATES PATENT OFFICE.

MARK S. KINNEY, OF SHELBY, NEBRASKA.

RIM.

Application filed January 15, 1923. Serial No. 612,743.

*To all whom it may concern:*

Be it known that I, MARK S. KINNEY, a citizen of the United States, residing at Shelby, in the county of Polk and State of Nebraska, have invented new and useful Improvements in Rims, of which the following is a specification.

My present invention has reference to a split spring rim for automobile tires, and has for its object to produce a rim having means associated therewith for expanding or contracting the same as well as for locking the ends of the rim when brought together.

To the attainment of the foregoing and other objects which will present themselves as the nature of the invention is better understood, reference is to be had to the drawing which accompanies and which forms part of this application.

In the drawing:—

Figure 1 is a side elevation of a split spring rim in accordance with this invention.

Figure 2 is a central transverse sectional view therethrough, looking toward the split end of the rim.

Figure 3 is an enlarged sectional view on the line 3—3 of Figure 2.

Figure 4 is a sectional view, similar to Figure 3, but showing the manner in which the rim is expanded or contracted.

The split rim 1 is of the usual construction and has its circumferential edges beaded or flanged. The rim, adjacent to one of its ends has an opening 4 therethrough, and this opening is centrally bridged by a substantially U-shaped transversely arranged lug 9. The second end of the rim is formed with a depression 2 that is surrounded by a housing 3. The lug 9 and the housing 3 are arranged on the inner face of the rim.

The numeral 6 designates a curved lever that has one of its ends provided with an offset finger 7, and inward of the finger the lever has a U-shaped offset portion 5 to be received in the opening 4 and to receive therein the bridge lug 9. The opposite end of the lever is formed with a hook 8 offset from the lever proper and serving as a finger piece whereby the lever may be swung on the rim, the lug 9 serving as a pivot for the lever.

Normally the fingered end 7 of the lever is received in the depression 2 and in the housing 3. When the rim ends are to be contracted as disclosed by Figure 4, the lever is swung angularly and outwardly on one of the rim sections, the shoulder 10 provided between the finger 7 and the end of the lever is brought to rest upon the outer wall of the housing 3, serving as a fulcrum, the finger proper contacting with the outer wall provided by the depression 2 and whereby the ends of the rim may be quickly and comparatively easily brought one over and above the other, as disclosed in the said Figure 4. A pressure in an opposite direction is exerted upon the lever when the rim is to be expanded to permit of the ends thereof being disposed in contacting position, and when the ends are so contacted the lever rests against the inner face of the rim, as disclosed in Figures 1, 2 and 3 of the drawings.

It is thought that the foregoing description, when taken in connection with the drawing, will fully set forth the construction and advantages of the improvement to those skilled in the art to which such inventions relate and that further detailed description will not be required. It is to be stated, however, that I do not wish to be restricted to the precise details of construction herein set forth, but hold myself entitled to all such changes therefrom as fall within the scope of the claim.

Having described the invention, I claim:—

A split rim and a means for contracting the rim or for bringing the ends thereof against each other, in which the rim adjacent one of its ends has a central opening centrally bridged by a substantially U-shaped transverse element, and in which the second end of the rim is formed with a depression that is surrounded by a housing, and the housing and the bridge lug being arranged on the inner face of the rim, and a curved lever having its outer end provided with an offset finger and being further provided adjacent said finger with a U-shaped offset, which latter is designed to be received in the referred to opening in the rim and to be engaged by the bridge element that straddles said opening, and the fingered end of the lever adapted to be received in the depression and to contact with the walls of the housing therefor when the lever is in normal position against the inner face of the rim, and also wherein neither the offset portion nor the fingered end of the lever projects beyond the outer face of the rim when the lever is in said position.

In testimony whereof I affix my signature.

MARK S. KINNEY.